(12) United States Patent
Lahti et al.

(10) Patent No.: US 7,366,091 B1
(45) Date of Patent: Apr. 29, 2008

(54) METHOD AND APPARATUS FOR CHANGING PARALLEL CLOCK SIGNALS IN A DIGITAL DATA TRANSMISSION

(75) Inventors: Harri Lahti, Klaukkala (FI); Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/937,588

(22) PCT Filed: Mar. 30, 2000

(86) PCT No.: PCT/FI00/00280

§ 371 (c)(1),
(2), (4) Date: Nov. 19, 2001

(87) PCT Pub. No.: WO00/60802

PCT Pub. Date: Oct. 12, 2000

(30) Foreign Application Priority Data

Apr. 1, 1999 (FI) .................................. 990739

(51) Int. Cl.
*G01R 31/08* (2006.01)
(52) U.S. Cl. ...................................... 370/218; 370/225
(58) Field of Classification Search ................ 370/334, 370/465, 252, 217–218, 221, 225, 515; 455/8, 455/134

See application file for complete search history.

(56) References Cited

U.S. PATENT DOCUMENTS 4,083,009 A * 4/1978 Bickford et al. ............ 375/347

4,451,916 A 5/1984 Casper et al. ................ 370/16

(Continued)

FOREIGN PATENT DOCUMENTS

EP 0 696 111 A2 2/1996

OTHER PUBLICATIONS

Andreas Iselt, "A New Synchronization Algorithm for Hitless Protection Switching in ATM Networks", Munich University of Technology (TUM), Institute of Communication Networks (LKN), pp. 370-376.

(Continued)

*Primary Examiner*—Hassan Kizou
*Assistant Examiner*—Bo Hui A Zhu
(74) *Attorney, Agent, or Firm*—Harrington & Smith, PC

(57) ABSTRACT

The object of the invention is to introduce an advanced method and arrangement for changing parallel data transmission connections in an assured data transmission link. According to the method of the invention, the transmission path to be received is changed, prior to the passage of errors, and the data transmission of the link remains free of errors, in case even one of the transmission paths transmits the data as error-free, even if errors occur in other paths. The error-free quality of the link is maintained also when error-free and erroneous data transmission paths are suddenly exchanged. This is realised by calculating, in the parallel outdoor units (OU) located in succession to the common indoor unit (IU), a check sum for the transmission paths, for the data located in the interval under observation, said check sum enabling error correction; by checking the correctness of the data in the receiving outdoor units or by correcting small correctable errors; and by selecting, in the receiving indoor unit, on the basis of a quality factor describing the error-free quality of paths, another more error-free transmission path, in case for instance weather conditions cause errors in the currently employed connection.

6 Claims, 8 Drawing Sheets

U.S. PATENT DOCUMENTS

| | | | |
|---|---|---|---|
| 5,155,483 A | 10/1992 | Morimoto | 340/825.03 |
| 5,172,396 A | 12/1992 | Rose, Jr. et al. | 375/107 |
| 5,507,035 A * | 4/1996 | Bantz et al. | 455/133 |
| 5,515,403 A * | 5/1996 | Sloan et al. | 375/371 |
| 5,631,896 A * | 5/1997 | Kawase et al. | 370/228 |
| 5,761,245 A | 6/1998 | Haukkavaara et al. | 375/267 |
| 6,611,942 B1 * | 8/2003 | Battistello et al. | 714/821 |
| 6,678,259 B1 * | 1/2004 | Schwengler | 370/329 |

OTHER PUBLICATIONS

Andreas Iselt, "A New Synchronization Algorithm for Hitless Protection Switching in ATM Networks", Munich University of Technology (TUM), Institute of Communication Networks (LKN), pp. 370-376, no update.

* cited by examiner

METHOD AND APPARATUS FOR CHANGING PARALLEL CLOCK SIGNALS IN A DIGITAL DATA TRANSMISSION

PRIORITY CLAIM

This is a national stage of PCT application No. PCT/FI00/00280, filed on Mar. 30, 2000. Priority is claimed on application No. 990739, filed in Finland on Apr. 1, 1999.

BACKGROUND OF THE INVENTION

The invention relates to a method and arrangement for changing parallel signals in the propagation assurance of digital data transmission, particularly for realising the propagation assurance of radio links. Said signals include clock and data signals. The invention is suited to other data transmission connections as well, for instance to connections using optical transmission paths.

The quality requirements for a digital radio link are generally known; said requirements are set for example by the ITU, International Telecommunication Union. The quality requirements refer to the reliability and interference-free quality of the transmission. The most important features are usability, error ratio and phase noise. Among the factors that affect the fulfilment of said criteria are hardware malfunctions, weather and changes in the signal path. In order to fulfil the requirements, it is necessary to provide an equipment and propagation assurance for the radio link. By means of equipment assurance, there is obtained a more reliable usability, and by propagation assurance, there is obtained both a lower error ratio, a lower phase noise and better operational features.

FIG. 1 is a block diagram illustrating one target of propagation assurance. A public switched telephone network (PSTN) 11 is connected by wires to a mobile switching centre (MSC) 12. The security of the radio link between the switching centre 12 and the base station controller (BSC) 13 is extremely important, wherefore it is generally assured. The controller 13 is further connected, by radio connections which can also be assured, to base telecommunication stations (BTS) 14, 16, 18 and to their antennas 15, 17, 19.

The propagation assurance of radio links is realised by means of one or several parallel radio connections. Now in parallel with the major radio connection, there is constructed one or several other backup transmission paths that carry the same information. The transmission paths are preferably different, in order to prevent possible interference caused by the terrain and/or weather changes from affecting both paths at the same time. Among the transmission paths, there is selected the one that has, in the prevailing conditions, a better signal at the station receiving the radio link. The applied criterion for the selection is generally the signal strength, but also the correctness of the parity of the received information. The changing of the transmission path is carried out by means of a specific changeover device, in a way that is as error-free as possible, by compensating both the dynamic and static phase differences caused by the proceeding of the signals in different transmission paths.

There also is known the generally assurance of digital data transmission by applying forward error correction (FEC). In the data flow, there is added auxiliary information that enables error correction.

A drawback with known arrangements is that when changing the transmission path to be received on the basis of a weakening signal, multipath propagation or erroneous bursts are not taken into account, although these can cause errors in the signal.

Another drawback is known arrangements is that the changing of the transmission path to be received cannot always be performed prior to an erroneous reception of the data, because when the error is detected, it has already passed the link.

Yet another drawback is known error correction methods is that errors cannot always be fully corrected.

SUMMARY OF THE INVENTION

The object of the invention is to introduce an advanced method and arrangement for changing parallel transmission connections of a data transmission link. In the method according to the invention, the transmission path to be received is changed prior to the passage of errors, and the data transmission of the link remains free of errors, in case at least one of the transmission paths transmits the data as error-free, even if errors occur in others. The error-free quality of the link remains also when an error-free data transmission path rapidly changes over to erroneous mode, and an erroneous data transmission path changes over to error-free.

This is realised by calculating for the transmission paths, in parallel outdoor units (OU) successive to a common indoor unit (IU), a check sum for the data contained in the interval under observation, said check sum enabling error correction, by checking in the receiving outdoor units the erroneous quality of the data or by correcting correctable errors and by selecting, in the receiving indoor unit, on the basis of a quality factor, representing error-free quality and obtained from the outdoor unit, a more error-free transmission path, in case the currently employed connection causes errors.

The invention relates to a method for changing parallel signals in digital data transmission, in which method the data flow to be transmitted is divided into several transmissions. According to the invention
- there is selected a primary transmission path,
- in the transmission paths there is calculated a check sum for the data flow of the length of the processed section, and the check sum is added to the processed section of the data flow in order to form a data frame to be transmitted,
- in the transmission paths, there is carried out the transmission of the data frame,
- correctable errors of the received data frames are corrected, and the error sum in the transmission paths is calculated,
- as an operation common to the transmission paths, the error sum of the selected transmission path is compared with the other paths and when necessary, the transmission path selected as the one to be received is changed over to a path with a smaller error sum, and
- the information of the data flow of the processed section of the selected transmission path is conducted to the output cable.

The invention relates to an indoor unit designed for digital data transmission and for the selection of the data flow of parallel signals in digital data transmission. According to the invention, the indoor unit comprises a changeover device for receiving and changing the signal on the basis of an error sum obtained from an outdoor unit.

The invention relates to an outdoor unit designed for digital data transmission and for the selection of the data flow of parallel signals in digital data transmission. According to the invention, the outdoor unit comprises a transmitter for transmitting the signal to be transmitted and respectively a receiver for receiving the signal, as well as the calculation of the error sum of the received signal and further the outputting of the information indicating said error sum to the indoor unit.

The invention also relates to an arrangement for changing parallel signals in digital data transmission, said arrangement comprising a first indoor unit, antennas for transmitting and receiving both parallel signals and a second indoor unit. According to the invention, it also comprises a first changeover device in the first indoor unit and a second changeover device in the second indoor unit for receiving the propagation assured data, and in both transmission paths, a first and second outdoor unit for processing the data to be transmitted by a modelling algorithm and respectively for processing the data to be received by a checking and error-correcting algorithm.

According to the invention, the changing of the transmission path is carried out always when a better data frame is received from the other path. Thus the changing is carried out frame by frame, by comparing the number of errors occurring in two or more parallel data flows.

The changeover device can be fully realised by means of an application specific integrated circuit (ASIC).

The preferred embodiments of the invention are set forth in the independent claims.

BRIEF DESCRIPTION OF THE DRAWINGS

The invention is described in more detail below, with reference to the accompanying drawings, where.

DETAILED DESCRIPTION OF THE PRESENTLY PREFERRED EMBODIMENTS

Figure 1:
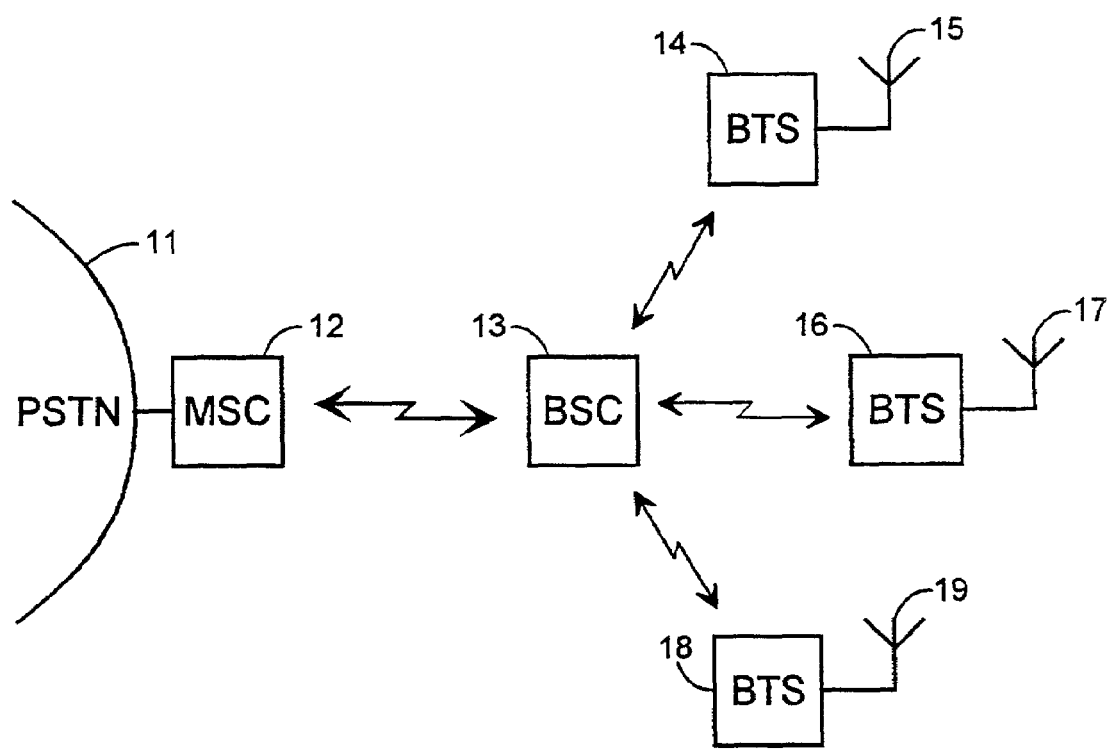
FIG. 1 is a block diagram illustrating a service environment of propagation assurance according to the invention.

FIG. 1 was already dealt with above, in the description of the prior art.

Figure 2:
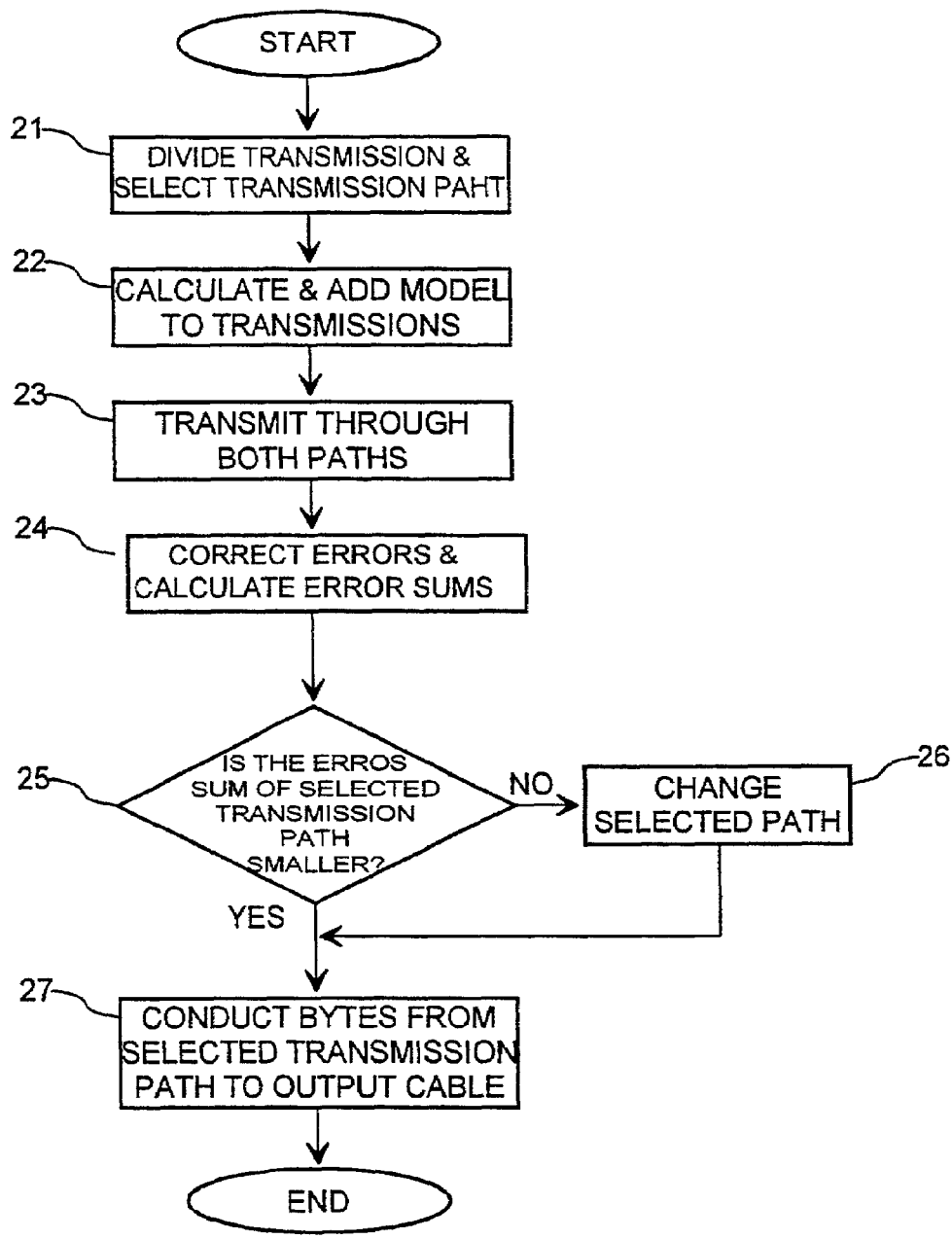
FIG. 2 is a flow diagram illustrating a method according to the invention.

The flow diagram of FIG. 2 illustrates the operation steps of a method according to the invention. The data flow to be transmitted is divided into two transmissions, and there is chosen a primary transmission path, i.e. a default path 21. In both transmission paths, there is calculated the check sum of a data flow of the length of the section to be processed, for instance by multiplying said data flow by a polynome suitable for modelling, whereafter the obtained check sum is added, 22, to the processed section of the data flow. The processed section of the original data flow and the check sum together form the data frame to be transmitted. The section to be processed defines a single element in the data flow to be processed by the error correction algorithm, such as a frame. On the basis of said element, there is preferably calculated a check sum, which enables error detection and the correction of small errors when receiving data. Errors are detected by calculating from the received section of the data flow another check sum according to the same method, and by comparing the obtained sums. Suitable polynomes are at least some dividing polynomes, the divisional remainder of which is used here.

In both transmission paths, the data frame transmission is carried out, for example via a radio connection 23. The transmission by radio includes signal modulation, transmission, reception and demodulation as well as filtering.

The correctable errors of received data frames, i.e. the number of symbols that is restricted by the precision of the model, are corrected and there is calculated an error sum which advantageously indicates the number of corrected errors 24. This procedure is carried out in both transmission paths.

As an operation common for both transmission paths, the error sum of the selected transmission path is compared, 25, with that of the other, and when necessary, the transmission path chosen as the one to be received, is changed over 26 to the one that has a smaller error sum and/or that has a better locking of the clock signal. Finally the data of the processed section of the data flow of the selected transmission path is conducted 27 to the output cable.

Figure 3:
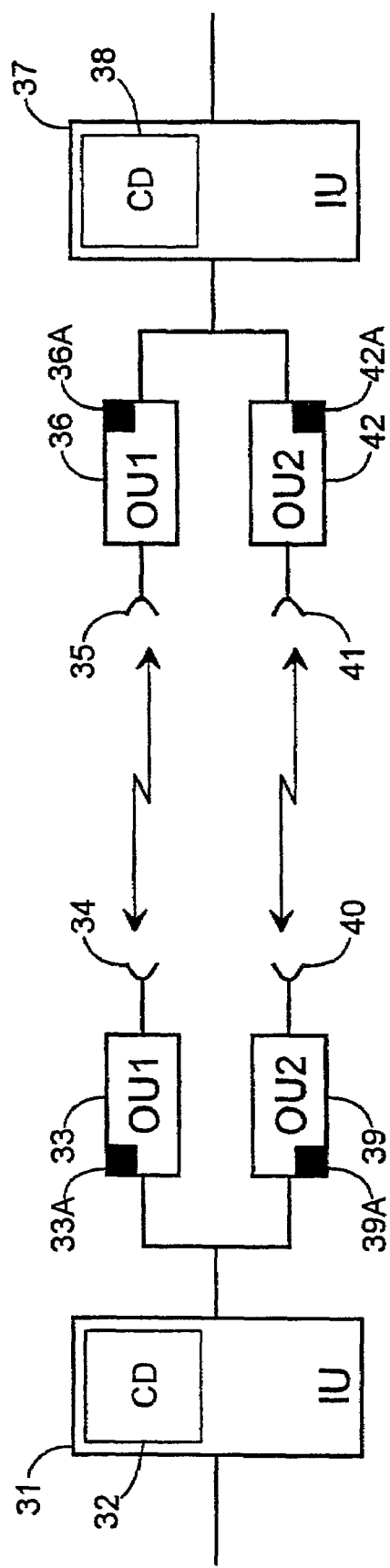
FIG. 3 is a block diagram illustrating an arrangement according to the invention.

FIG. 3 is a block diagram illustrating the essential elements of a propagation assurance arrangement. An indoor unit (IU) 31 comprises a changeover device (CD) 32 for receiving propagation assured information. The first transmission path comprises an outdoor unit (OU) OU1 33, antennas 34, 35 and an outdoor unit OU1 36. On the right-hand side, there is shown an indoor unit IU 37 that is common for both transmission paths, and a changeover device CD 38 included in said indoor unit 37. The other transmission path comprises corresponding devices 39, 40, 41, 42. The selection of the transmission path for transmissions from left to right is carried out by the changeover device 38, and the selection of the transmission path for transmissions from right to left is carried out by the changeover device 32. The outdoor units 33, 36, 39, 42 comprise means 33A, 36A, 39A, 42A for creating and outputting the signal that indicates the mode of the synchronization in the clock signal reception and the error sum of the data to be received.

Figure 4:
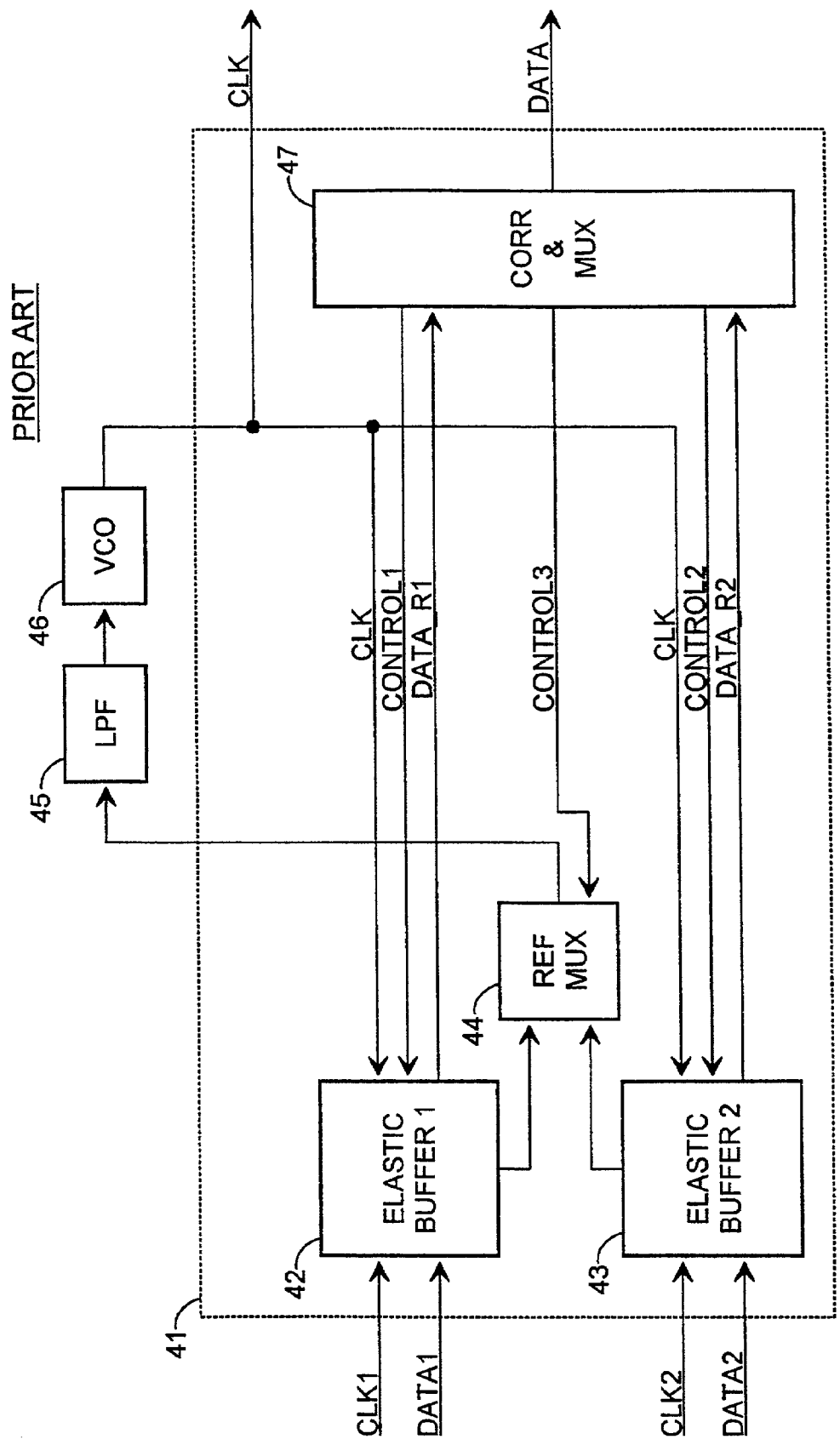
FIG. 4 is a block diagram illustrating a known signal changeover device.

FIG. 4 illustrates a prior art changeover device where the pairs of two clock signals CLK and a data signal DATA are changed. The elements outlined by the dotted line 41 are realised by an application specific integrated circuit (ASIC), and they include the following parts: an elastic buffer ELASTIC BUFFER 1 receiving the first signal pair CLK1, DATA1, an elastic buffer ELASTIC BUFFER 2 receiving the second signal pair CLK2, DATA2, a multiplexer REF MUX 44 of the reference clock signal, as well as a correlator and multiplexer CORR & MUX 47. Outside the integrated circuit, there are needed at least an analog low pass filter (LPF) 45 and a voltage controlled oscillator (VCO) 46. The difference in the write and read addresses of the active buffer 42 or 43 is conducted, via the multiplexer REF MUX 44, to the filter 45 in order to control the voltage controlled oscillator 46.

The writing to buffers is synchronised with incoming clock signals CLK1, CLK2, and the reading is synchronised by the output signal CLK of the voltage controlled oscillator 46, which signal is locked to the clock signal CLK1 or CLK2 of the active cable by the signal of the time difference between writing and reading the information, which signal is obtained from the buffer. The cable to be received is determined in the correlator 47, and there are created control signals CONTROL1, 2 for reading the buffers and a control signal CONTROL3 for controlling the multiplexer.

Figure 5:
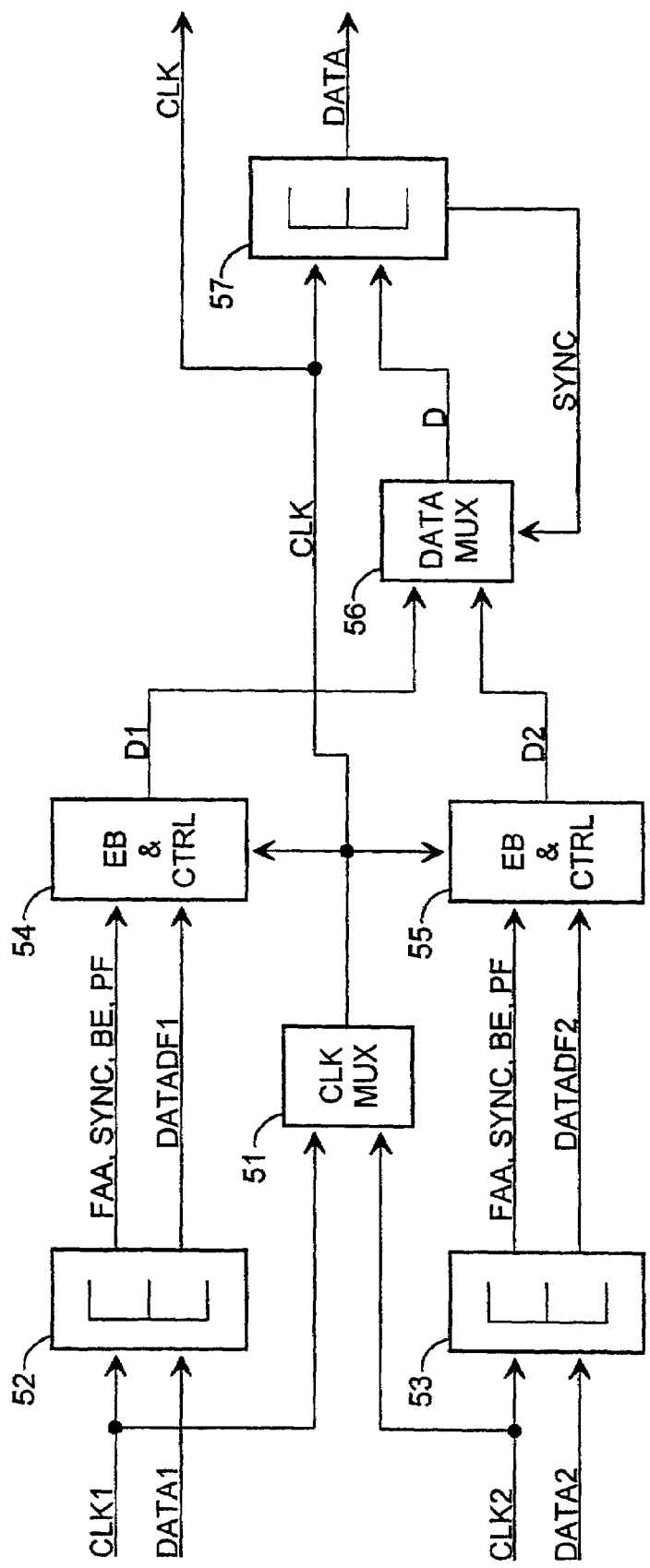
FIG. 5 is a block diagram illustrating a changeover device applying a clock signal multiplexer according to the invention.

FIG. 5 represents a block diagram of a signal changeover device according to the invention in an application specific integrated circuit. The clock signals CLK1, CLK2 of the received signal pairs are conducted to the clock signal multiplexer CLK MUX 51, where the clock signal to be received is selected. Both the clock signals CLK1, CLK2 and the data signals DATA1, 2 are also conducted to the data frame decoding blocks 52, 53, where the signals are used to create for example the following signals: synchronising signal SYNC, bit error (BE) signal, frame alignment alarm (FAA) signal, and pseudo frame (PF) signal, as well as the data signals DATA_DF1, DATA_DF2 decoded from the frames. The outdoor unit OU activates the PF signal while loosing the locking of the clock signal CLK1, CLK2 to be received. In that case the data signal to be transmitted is replaced by a predetermined frame structure. The PF signal is used to indicate, prior to the FAA signal, an error situation in the reception of the clock signal CLK1, CLK2 in the indoor unit, and the FAA signal is only activated on the basis of several alignment errors in received frames. Owing to the pseudo frame structure, the data transmission between the outdoor unit OU and the indoor unit IU can be kept in operation even if the outdoor unit does not receive a proper clock signal. The signals are conducted to the blocks of elastic buffers EB & CTRL 54, 55, where also the selected clock signal CLK to be received is conducted in order to synchronise the data. From the blocks 54, 55, the data signals D1, D2 are conducted, by the data signal multiplexer DATA MUX 56, as a signal D of the decoding block 57. In the decoding block 57, the multiplexer 56 is controlled by the signal SYNC.

Figure 6:
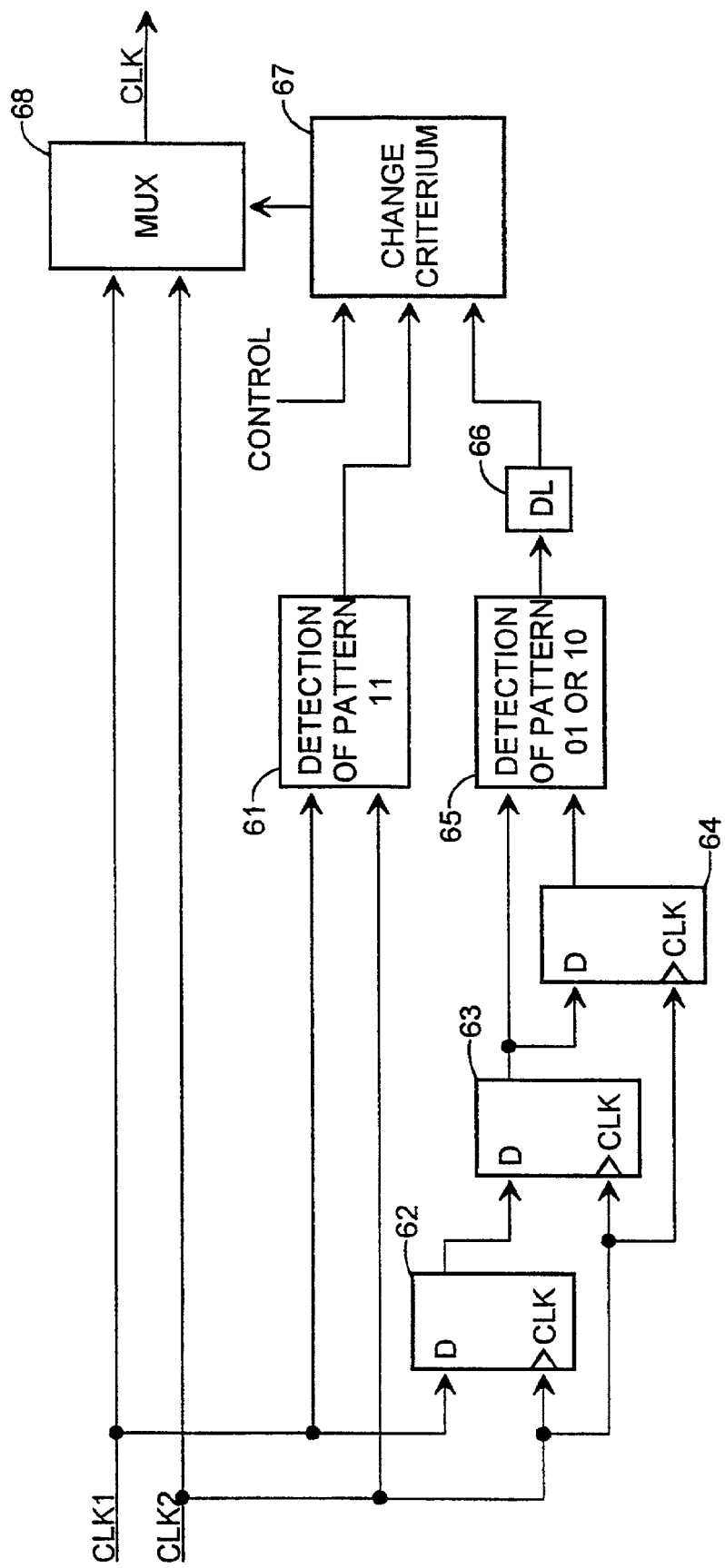
FIG. 6 is a block diagram illustrating a clock signal multiplexer according to the invention.

FIG. 6 illustrates a clock signal multiplexer belonging to an arrangement according to a preferred embodiment of the invention, which multiplexer waits for a suitable clock signal phase in order to change the signals, whereafter the signals are changed. The block 61 detecting the signal pattern "11" sends an active signal when the value of both clock signals CLK1, CLK2 is one. The flip-flop circuits D 62, 63, 64 form a phase shift sensitive coupling, the outputs whereof are conducted to the block 65 detecting the signal patterns "01" and "10". Owing to said coupling, the output of the block 65 is raised to value one after the period of one clock cycle of the clock signal CLK2 has passed from the moment when the polarity of the phase difference between the clock signals CLK1, CLK2 was changed. Thus the phase difference at the moment of a rise in the output of the block 53 is virtually non-existent or 180°. If the signals are cophasal, they can be exchanged almost without a phase shift after a short delay DL 66. The changing of the clock signals by the multiplexer 68 is controlled by the block 67 checking the criteria of the changeover operation, which block 67 receives as input signals a control signal requesting the changeover, a signal indicating the clock signal pattern "11" and a signal indicating the shift in the clock signal phase and delayed by the delay DL. On the basis of said criteria it is known that the signals are cophasal and not in a phase shift of 180°. The purpose of the delay DL is to ensure that the changing of the clock signals is carried out while the clock signals are, from the point of view of the system, in a static mode, i.e. in mode one. This prevents the creation of a disturbing voltage peak.

Figure 7:
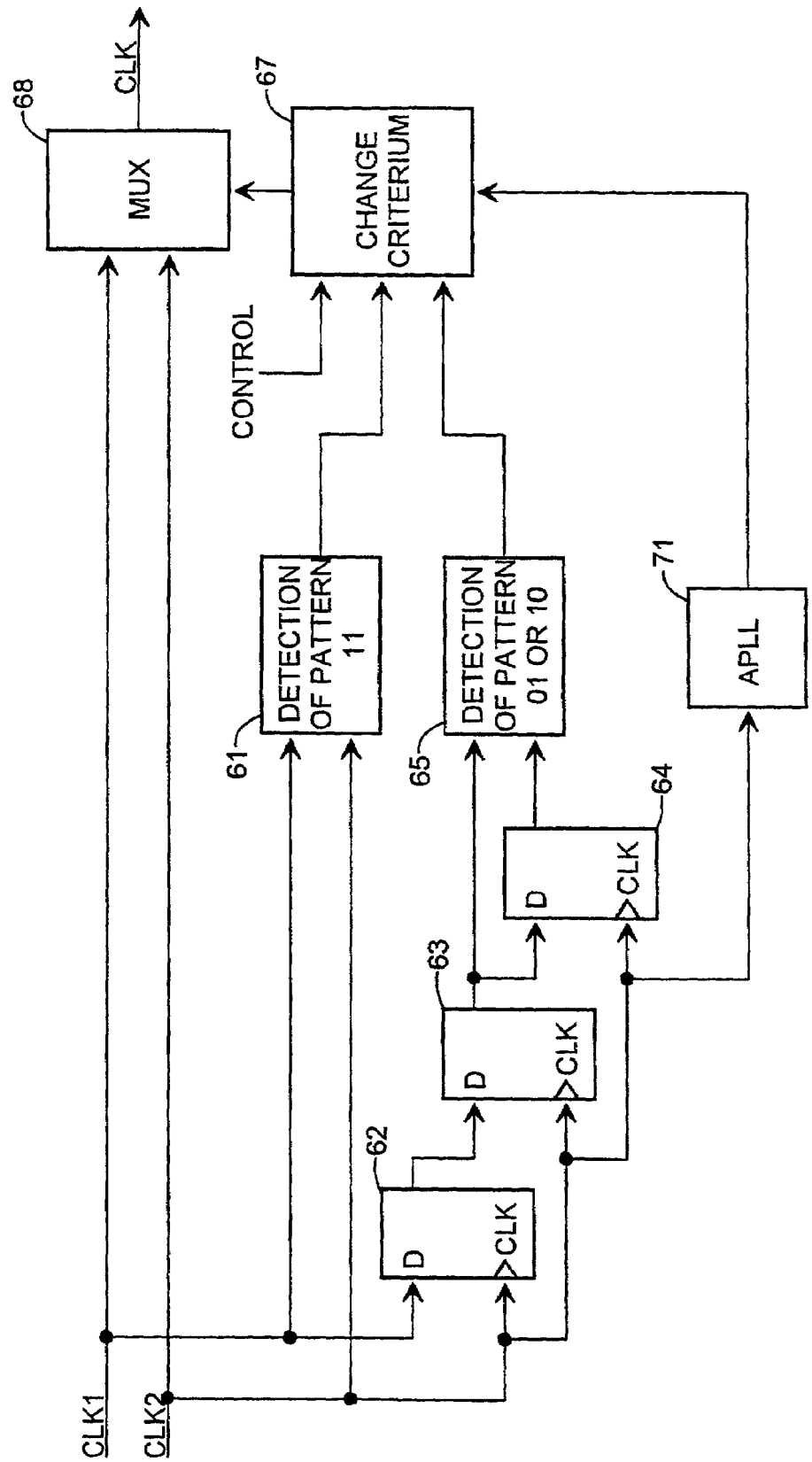
FIG. 7 is a block diagram illustrating another clock signal multiplexer in an arrangement according to the invention.

FIG. 7 illustrates another clock signal changeover device belonging to an arrangement according to the invention, which device comprises, in addition to the embodiment illustrated in FIG. 6, an analog phase-locked loop (APLL) 71 for synchronising the change, said loop multiplying the frequency of the second clock signal CLK2 by four. The output of the loop 71 is conducted to the block 67 that checks the changeover criteria. Owing to the use of the APLL, the delay DL illustrated in FIG. 6 is not needed here, because the changeover mode can be delayed by applying a later phase of the signal that was multiplied by four in frequency.

The block 61 indicating the clock signal pattern "11" can be realised for example by an AND gate. The block 65 indicating the pattern "01" or "10" can be realised for instance by an XOR gate. The block 86 indicating the pattern "10" can be realised for example by an inverter plus an AND gate.

Figure 8:
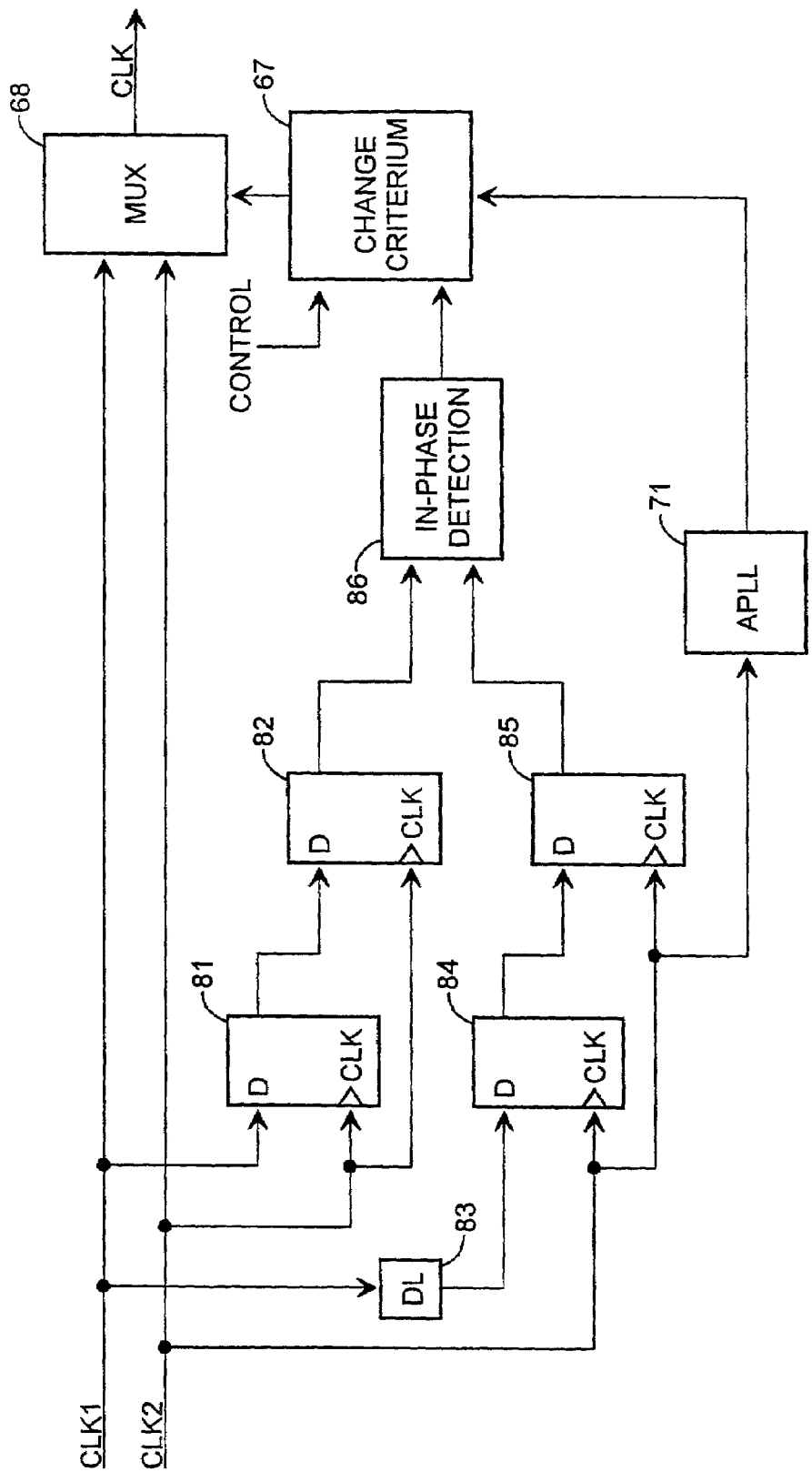
FIG. 8 is a block diagram illustrating a third clock signal multiplexer in an arrangement according to the invention.

FIG. 8 illustrates a third clock signal changeover device according to the invention, wherein the phase difference between the signals is detected while the prevailing time difference is no longer than the delay DL. When the clock signal CLK1 is a little bit ahead of the clock signal CLK2, the output mode of the D flip-flops 81, 82 is transmitted as one, but when the phase difference in any case causes a delay DL 83, the output mode of the D flip-flops 84, 85 is transmitted as zero. Now the signals are considered to be sufficiently accurately cophasal, and the phase detector 86 obtains as input the output signals of the D flip-flops 82, 85 in modes one and zero, and gives as output the signal one. The analog phase locked loop 71, the block 67 for checking the changeover criteria and the multiplexer 68 are otherwise operated in similar fashion as in the case of FIGS. 6 and 7, but the block 67 only takes into account the loop 71, the phase detector 86 and the control signals.

The respective elements in the above described drawings 6, 7 and 8 are referred to by the same numbers in order to better illustrate the situation.

Figure 9:
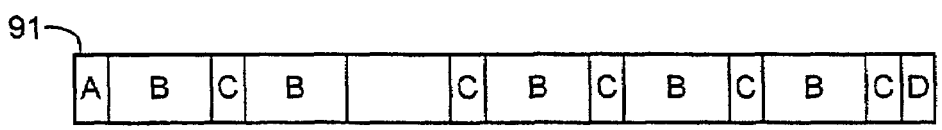
FIG. 9 illustrates a data frame.

FIG. 9 illustrates, by way of example, the structure of a data frame. The data frame 91 starts with a locking bit string A, continues with successive pairs of data B/check sum C, and ends with a locking bit string D. The locking bit strings A, D are preferably similar, and they are used in the frame for locking while decoding the frames.

Let us now observe an example of a propagation assured radio link according to the invention, where the applied error correction method is an RS (63, 59) algorithm.

With both transmission paths in the outdoor units OU1, OU2, there is calculated a check sum for a data flow of the length of the period under observation, by multiplying the data RS (63, 59) to be checked by a primitive polynome. The check sum is added as a continuation to the data to be checked. Here the period of observation is 354 bits, i.e. 59 bytes, when one byte includes 6 bits. The length of the data frame formed by the payload information contained by said period plus the check sum is 378 bits, i.e. 63 bytes, of which the share of the check sum is 4 bytes.

Here the created data frames are transmitted via two different radio paths, which are susceptible to disturbances in ways that are as different as possible. Thus possible interference generally causes errors only in one transmission path at a time.

The received data frames are processed in receiving outdoor units OU1, OU2 by dividing the transmitted data frame by a generator polynome, so that a divisional remainder is obtained. The algorithm that locates errors uses said remainder for detecting errors. In addition to error detection, errors can also be corrected, in this case no more than two erroneous bytes. The maximum amount of bytes that can be corrected can be raised, by means of interleaving, up to eight bytes. The bytes are corrected, and there is calculated an error sum that indicates how many errors the received data contained. In the outdoor units OU1, OU2 there is created a data frame that contains the corrected payload information and the error sum.

The indoor unit IU receives from both outdoor units OU1, OU2 a data frame, and the changeover device CD selects, on the basis of the error sum, a better transmission path for the payload information to be further conducted to the output cable.

The invention can be used for example for backing up the links in radio networks conforming to the plesiochronous digital hierarchy (PDH). In that case, for instance the frequencies of radio links in the GSM network fluctuate within the range 7-38 GHz, and even a reading as high as 58 GHz is possible. In this type of application, the payload signal is a data signal of the plesiochronous digital hierarchy (PDH), with a general velocity of 2 Mbit/s or an even multiple thereof, but it may be also be at least 34 Mbit/s. The length of the link is something between a hundred metres up to as much as several tens of kilometres.

Here an active mode of the signal means that the signal criteria are fulfilled. Thus the signal mode is true or advantageously one. The signal modes can also be inverted, in which case instead of mode "11", there is observed mode "00". The term 'identical modes' refers, however, to modes "11" or "00", and 'un-identical modes' means modes "01" or "10".

The indoor unit and outdoor unit here refer to the symbolic position of the unit in the system, and this does not restrict the location of said unit in the interior or exterior of a building.

The number of transmission paths can be two or more.

The invention is not restricted to the above described embodiments only, but many modifications are possible within the scope of the invention idea defined in the appended claims.

What is claimed is:

1. A method comprising:
   selecting a primary transmission path;
   calculating a check sum for the data flow of a length of a processed section of the data flow, said check sum being added to the processed section of the data flow in order to form a data frame to be transmitted;
   transmitting the data frame in at least two transmission paths that include the primary transmission path;
   correcting correctable errors in received data frames and calculating an error sum for each of the at least two transmission paths;
   comparing the error sum of one of the transmission paths with an error sum of another of the at least two transmission paths and changing to the transmission path with the smaller error sum;
   changing a clock signal to the transmission path with the smaller error sum after waiting for sufficiently accurate cophasal clock signals; and
   forwarding data of the processed section of the data flow from the transmission path with the smaller error sum to an output cable.

2. The method according to claim 1, wherein the check sum is calculated by multiplying the data flow by a polynome suitable for modelling.

3. An indoor unit comprising:
   at least a changeover device for receiving and changing a propagation assured signal on a basis of an error sum obtained from an outdoor unit;
   wherein said changeover device is configured to change clock signals after waiting for sufficiently accurate cophasal clock signals; and wherein the changeover device comprises:
   a multiplexer for receiving the clock signals of signal pairs to be received and for selecting one of the clock signals;
   data frame decoding blocks for receiving the clock signals and data signals and for forming them into control signals and data signals which are decoded from data frames;
   elastic buffer and control blocks for receiving the control signals and data signals decoded from the data frames and for receiving the selected clock signal in order to synchronize the data signals decoded from the data frames;
   a data signal multiplexer for receiving the synchronized data signals from the elastic buffer and the control blocks; and
   a decoding block for receiving at least one of the synchronized data signals from the data signal multiplexer and for controlling the data signal multiplexer.

4. The indoor unit according to claim 3, wherein the indoor unit comprises part of a radio link in a mobile telecommunications system.

5. An apparatus comprising:
   a first indoor unit for dividing data which flows over a radio link, said first indoor unit having a first changeover device for receiving propagation assured data;
   antennas for transmitting and receiving parallel clock signals; and
   a second indoor unit for selecting a data flow of the divided data, said second indoor unit having a second changeover device for receiving the propagation assured data;
   wherein said changeover devices are configured to change clock signals after waiting for sufficiently accurate cophasal clock signals, and the first and second outdoor units comprise means for processing data to be transmitted using an algorithm that models the data to be transmitted, checks the data to be received and corrects errors in the data,
   wherein each of the changeover devices comprises:
   a multiplexer for receiving the clock signals of signal pairs to be received and for selecting one of the clock signals,
   data frame decoding blocks for receiving the clock signals and data signals and for forming them into control signals and data signals which are decoded from data frames,
   elastic buffer and control blocks for receiving the control signals and data signals decoded from the data frames and for receiving the selected clock signal in order to synchronize the data signals decoded from the data frames,
   a data signal multiplexer for receiving the synchronized data signals from the elastic buffer and control blocks, and
   a decoding block for receiving one of the synchronized data signal from the data signal multiplexer and for controlling the data signal multiplexer.

6. The apparatus according to claim 5, wherein the apparatus comprises part of a radio link in a mobile telecommunications system.

* * * * *